Nov. 10, 1953 R. G. PIETY 2,659,064
ROTATIONAL SEISMOMETER
Filed Aug. 19, 1949 4 Sheets-Sheet 1

INVENTOR.
R.G. PIETY
BY Hudson & Young
by: L. Malcolm Oberlin
ATTORNEYS

Nov. 10, 1953        R. G. PIETY        2,659,064
ROTATIONAL SEISMOMETER
Filed Aug. 19, 1949        4 Sheets-Sheet 2
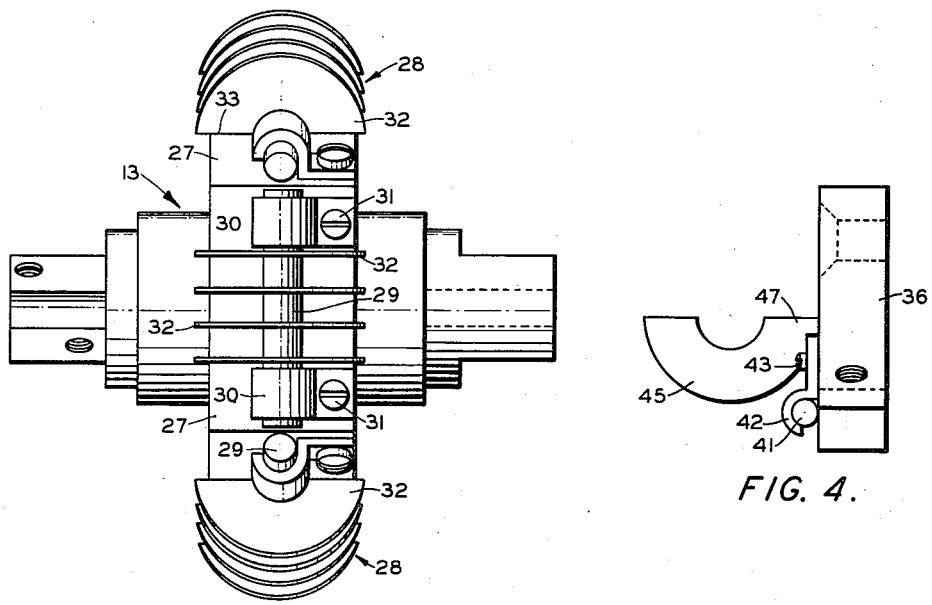
FIG. 3.
FIG. 4.
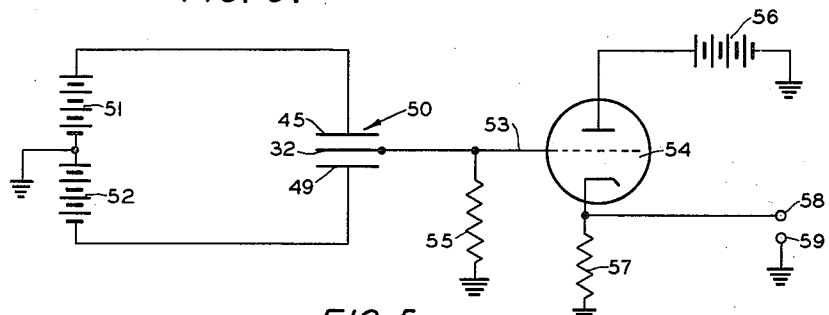
FIG. 5.
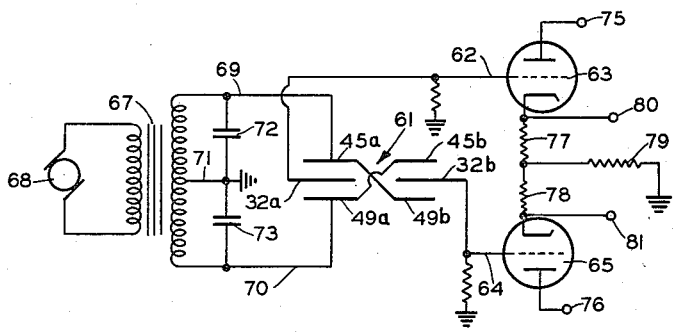
FIG. 6.
INVENTOR.
R. G. PIETY
BY Hudson & Young
by L. Malcolm Oberlin
ATTORNEYS Nov. 10, 1953  R. G. PIETY  2,659,064
ROTATIONAL SEISMOMETER
Filed Aug. 19, 1949  4 Sheets-Sheet 3

INVENTOR.
R. G. PIETY
BY *Hudson & Young*
*by L. Malcolm Oberlin*

ATTORNEYS

Nov. 10, 1953    R. G. PIETY    2,659,064
ROTATIONAL SEISMOMETER

Filed Aug. 19, 1949    4 Sheets-Sheet 4

INVENTOR.
R. G. PIETY
BY Hudson & Young
by L. Malcolm Oberlin
ATTORNEYS

Patented Nov. 10, 1953

2,659,064

UNITED STATES PATENT OFFICE 2,659,064

ROTATIONAL SEISMOMETER

Raymond G. Piety, Bartlesville, Okla., assignor to Phillips Petroleum Company, a corporation of Delaware Application August 19, 1949, Serial No. 111,282

17 Claims. (Cl. 340—17)

This invention relates to rotational seismometers for producing electrical voltages representative of rotational components of earth movement due either to surface waves or the shear component of a general disturbance.

In the art of geophysical prospecting, an explosive charge is detonated at a location referred to as the "shot point," the resulting explosion causing seismic waves to be propagated through the earth. At a position remote from the shot point, the seismic waves are converted into electrical voltages representative thereof by an electro-mechanical transducer or seismometer and these electrical currents are amplified and recorded, the resulting record yielding valuable information as to the nature and configuration of subterranean strata. In the usual geophysical prospecting system, the seismometers are responsive to all vertical movements of the earth, some of which are caused by seismic waves which penetrate the earth and are reflected from subterranean strata, these reflected waves yielding the data which are of interest to the geophysicist. However, certain of the seismic waves, which are often referred to as Rayleigh waves or ground roll, are propagated along the surface of the earth and the vertical motion of the seismometer resulting from these ground waves makes it difficult to observe the reflected or refracted waves from the subsurface.

In my copending application, Serial No. 49,081, filed September 13, 1948, now abandoned, I have disclosed a method for eliminating the effect of ground roll by combining the output of a rotational type seismometer with the output of an ordinary translational seismometer. The rotational seismometer is responsive to the rocking movement of the earth due to ground roll and is not affected by reflected waves, provided that it is properly oriented with respect to the shot point. As pointed out in the copending application, the output of a rotational seismometer may be electrically altered so as to provide an electrical voltage which will neutralize the effects of the translational or vertical component of ground roll when mixed with the electrical output of an ordinary seismometer.

I have found that rotational seismometers previously known are not sufficiently sensitive and accurate to provide reliable results when used in the system described by my previously-mentioned copending application. Difficulties are encountered in the use of such seismometers in that the output is affected by the reflected waves and uniform results are not obtained when ground waves of equal amplitude are caused to actuate the seismometer.

It is an object of this invention to provide a rotational seismometer which is highly sensitive and which accurately responds to movement of the earth resulting from ground roll.

It is a further object of the invention to provide a rotational seismometer which is not affected by vertical movement of the earh due to reflected seismic waves.

It is a still further object of the invention to provide a rotational seismometer which is rugged in construction, reliable in operation, has a minimum of moving parts, and is economical to manufacture.

Various other objects, advantages and features of the invention will become apparent from the following detailed description taken in conjunction with the accompanying drawings, in which:

Figure 3 is a plan view of the suspended element;

Figure 4 is a view showing the supporting structure for one of the condenser plate elements;

Figures 5 and 6 are schematic circuit diagrams illustrating a suitable circuit for converting capacitance variations into electrical voltages representative thereof;

Figure 1:
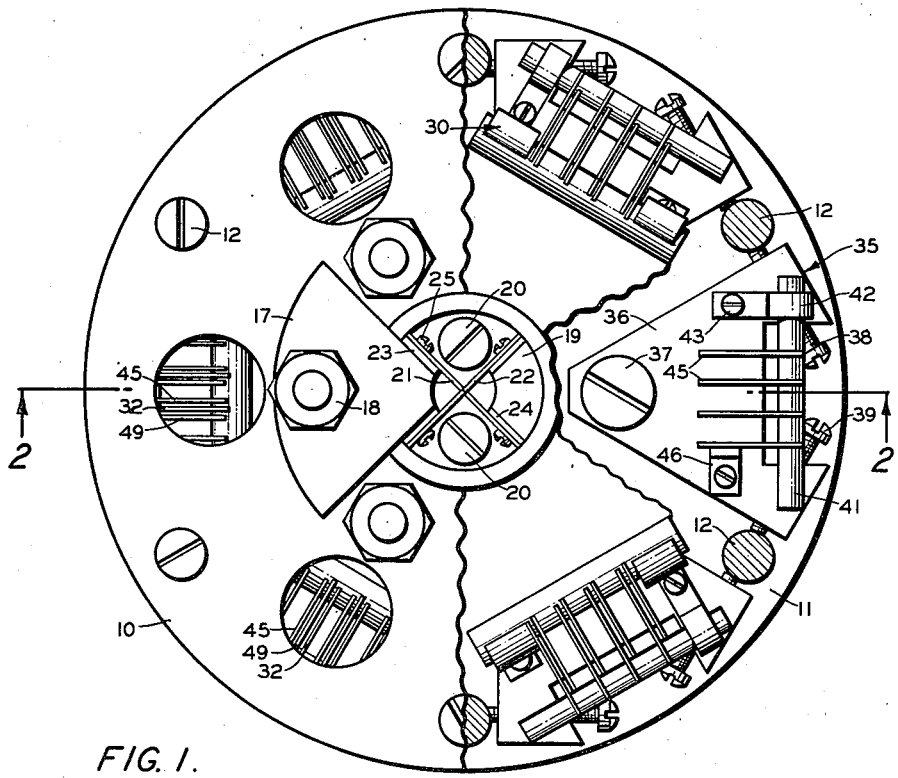
Figure 1 is a top plan view of a rotational seismometer constructed in accordance with this invention with a portion of the cover and rotor broken away to show the interior construction.
Figure 2:
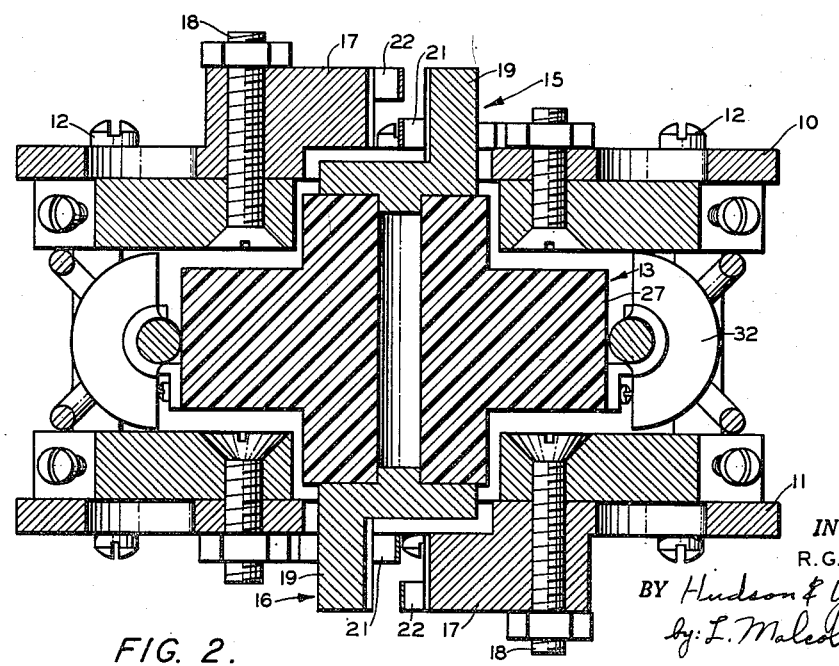
Figure 2 is a sectional view taken along the line 2—2 of Figure 1.

Referring now to the drawings in detail, and particularly to Figures 1 and 2, the rotational seismometer may include a casing defined by spaced, non-magnetic flat supports 10, 11 which are maintained in proper parallel relationship by spacers 12. A suspended element 13 is mounted for rotation within the casing by a pair of identical spring suspension units 15 and 16. Each spring suspension includes a sector shaped block 17 secured to one of the supports 10 or 11 by a screw 18, and a block 19 secured to suspended element 13 by bolts 20. Each set of blocks 17, 19 is connected together by elongated resilient flexure plate hinges 21 and 22. Each of the hinges 21, 22 is provided with plates 23, 24 at the respective ends thereof which are secured to the blocks 17, 19 by screws 25.

When assembled, it will be apparent that the hinges 21, 22 are at right angles to each other and that said hinges lie in planes defined by the axis of suspended element 13. The spring suspension units 15, 16 are identical in construction but suspension 16 is rotated 180 degrees with respect to suspension 15. These resilient hinges are very efficient in eliminating translational movement of the suspended element. Thus, although the suspended element is free to rotate to the casing, the suspensions 15, 16 prevent either axial or transverse displacement thereof with respect to the casing. In addition, the spring suspensions bias the suspended element to a predetermined angular position with respect to the casing.

The suspended element 13 is provided with a number of flat surfaces 27 at its periphery, one surface for each condenser unit to be mounted thereon, as hereafter explained. Thus, if six condenser units are utilized, as in the present example, the suspended element is of hexagonal cross section. Each flat surface carries a condenser unit 28 which, in the example of Figures 1 to 3, includes a rod 29 secured to the adjacent surface 27 by brackets 30 mounted at opposite ends thereof, each bracket being secured to the suspended element by a screw 31. Each rod carries a series of flat thin metal plates 32 and, as will become apparent later, each series of plates functions as one element of an air dielectric condenser.

A series of condenser elements 35 is arranged in circular formation upon the flat support 11. Each element includes a sector shaped plate 36 pivoted to support 11 by a pin 37, and each pivoted member carries a pair of set screws 38, 39 which are engageable with two adjacent spacers 12. It will be apparent that each member 36 may be adjusted angularly about its pivot 37 by movement of set screws 38 and 39.

Each assembly 35 further includes a rod 41 having one end thereof firmly secured to member 36 by a bracket 42 and a screw 43. A series of flat, thin metal plates 45 is carried by each rod 41 and these plates are mounted in closely spaced parallel arrangement, the end plate of the series being secured to a bracket 46, as by soldering, to hold the plates and rod in proper position upon pivoted member 36. In assembling the elements 35, the bracket 42 is first secured to rod 41, after which minor adjustments in position of the plate assembly may be made. When the assembly is located in its final position, bracket 46 is soldered to its adjacent plate 45. It will be noted that the plates 45 are of generally semicircular configuration and that each plate abuts pivot member 36, as shown at 47, so that the plates are maintained in a rigid assembled position upon the pivot member.

A set of condenser elements, similar to elements 35, is suspended from upper support 10 so that each lower condenser element 35 has an upper condenser element cooperating therewith. The upper condenser elements have plates 49, Figure 1, which are mounted in interfitting relation with the plates 45 of the respective condenser elements 35 and the plates 32 of the suspended element condenser units 28 to the end that each plate 32 is disposed between a plate 45 forming a part of one of the lower condenser elements and a plate 49 forming a part of one of the upper condenser elements. The spring suspension units 15, 16 bias the suspended element 13 to a position wherein each plate 32 is disposed midway between two of the plates 45 and 49.

When a ground wave, shear wave, or other seismic wave having a rotational component is incident upon the seismometer, the casing is moved angularly a distance which is equal to the angular amplitude of the seismic disturbance. The suspended element 13, however, remains stationary relative to the casing due to its inertia. As a result, changes in capacitance occur between the plates 32, 45 and 49 which are representative of the waves incident upon the seismometer. In particular, referring to Figure 1, if the casing moves in a clockwise direction relative to the suspended element, the capacitance between the plates 32, 45 is increased and the capacitance between the plates 32, 49 is decreased a corresponding amount. If the casing moves in a counterclockwise direction relative to the suspended element in response to seismic waves incident upon the seismometer, the capacitance between plates 32, 45 is decreased and the capacitance between plates 32, 49 is increased, the increase and decrease in capacitance being proportional to the amplitude of the rotational component of the seismic waves.

The changes in capacitance thus produced may be converted to electrical voltages representative thereof by the circuits shown in Figures 5 and 6. Referring to Figure 5, the seismometer is represented by the unit 50. All the plates 45 are interconnected and, accordingly, are represented by a single line in the schematic diagram. Similarly, the plates 32 and 49 are all connected together and represented by single lines upon the schematic circuit diagram. A current source 51 is connected between plates 45 and ground, and a battery 52 is connected between plates 49 and ground. The batteries are so poled that voltages of opposite polarity are impressed upon the plates 45 and 49. Plates 32 are connected by a lead 53 to the control grid of a triode 54, and a grid resistor 55 is connected between lead 53 and ground. An operating potential is applied to the anode of tube 54 by a battery 56, and a resistor 57 is connected between the cathode of tube 54 and ground. One output terminal 58 is connected directly to the cathode of the tube and the other output terminal 59 is grounded. When the capacitance between plates 32, 45, and 49 is changed in the manner described responsive to seismic waves, a voltage representative of the changes in capacitance is impressed upon the control grid of tube 54, said voltage appearing across the output terminals 58 and 59. It will be noted that a cathode follower circuit is utilized for faithful reproduction of the output voltages.

It is a feature of the invention that the time derivative of earth movement to which the seismometer is sensitive and is responsive may be readily varied by changing the mechanical tuning of the spring units 21, 22 and the impedance of resistor 55. That is, by changing these factors, the output of the seismometer may be changed so that it represents displacement, velocity, acceleration, or rate of change of acceleration, as desired. Small variations in the nature of the time derivatives do not alter the proper functioning of the seismometer. In particular, if springs 21, 22 are tuned to a low frequency, a resistor 55 of high impedance is provided in the grid circuit of tube 54, the output of the seismometer is representative of angular displacement produced by the seismic waves. If springs 21, 22 are tuned to a high frequency and resistor 55 has a high impedance, the output of the seismometer is representative of angular acceleration. If the springs are tuned to a low frequency and resistor 55 has a low impedance, the output is representative of angular velocity whereas if the springs are tuned to a high frequency and resistor 55 has a low impedance, the output of the seismometer is representative of rate of change of acceleration. In Figure 5, current sources 51, 52 are batteries so that a direct current is applied to plates 45 and 49, thereby producing a voltage which is proportional to the voltage of the seismic disturbances. If the batteries are replaced by generators or other alternating current sources, the output is an amplitude modulated alternating current signal.

By utilizing the circuit of Figure 6, extraneous noise voltages may be balanced out, so that the alternating current output is modulated only by voltages representative of the amplitude of the seismic signals. In this circuit, the seismometer is represented by unit 61. Assuming that an even number of condenser assemblies is utilized, for example, six assemblies, the plates 45 of a first group of three assemblies is connected to the plates 49 of the second group of three assemlies, as represented by line 45a, 49b on the drawing. The plates 49 of the first group are connected to the plates 45 of the second group thus producing a plate assembly represented by line 49a, 45b in Figure 3. The plates 32 of the first group, which are represented by line 32a, are connected by a lead 62 to the control grid of a triode 63 while the plates 32 of the second group, represented by line 32b are connected by a lead 64 to the control grid of a triode 65. If desired, instead of segregating the two groups, two separate seismometers may be utilized and connected as shown. An alternating voltage is applied to the primary winding of a transformer 67 by a current source 68 and this transformer has a center tapped secondary winding, the end terminals of which are connected by leads 69 and 70, respectively, to the plate units 45a, 49b and 45b, 49a. The center tap of the transformer secondary winding is grounded by a lead 71, and condensers 72, 73 are connected between leads 71 and the respective leads 69 and 70. Operating potentials are supplied to the anodes of tubes 63, 65 from power supply terminals 75, 76 and the cathodes of the tubes are interconnected by series resistances 77 and 78, the junction between these resistances being connected to ground through a bias resistor 79. Output terminals 80, 81 are connected to the respective cathodes 63 and 65.

When the casing is moved in a counterclockwise direction, Figure 1, relative to the suspended element, the capacitance between plates 32a, 45a and 32b, 45b is decreased while the capacitance between plates 32a, 49a and 32b, 49b is increased. Since voltages of opposite phase are applied to opposite plates of each assembly by transformer 67 the voltage on the control grid of tube 63 is decreased and that on the control grid of tube 65 is increased in a corresponding amount, thus producing an output voltage representative of the seismic signals across output terminals 80 and 81. When the casing rotates in a clockwise direction, Figure 1, relative to the suspended element, an opposite action occurs with the result that the voltage impressed on the control grid of tube 65 is decreased and the voltage applied upon the control grid of tube 63 is increased, thus producing a signal of opposite polarity across the output terminals 80 and 81. However, an unwanted or extraneous noise voltage appearing on plates 45a, 49b, for example, is effectively balanced out since such a voltage produces a decrease in the grid potential of both tubes which does not affect the output signal. Accordingly, the push-pull circuit is very advantageous in eliminating unwanted noise voltages from the output of the tubes 63 and 65.

Figure 7:
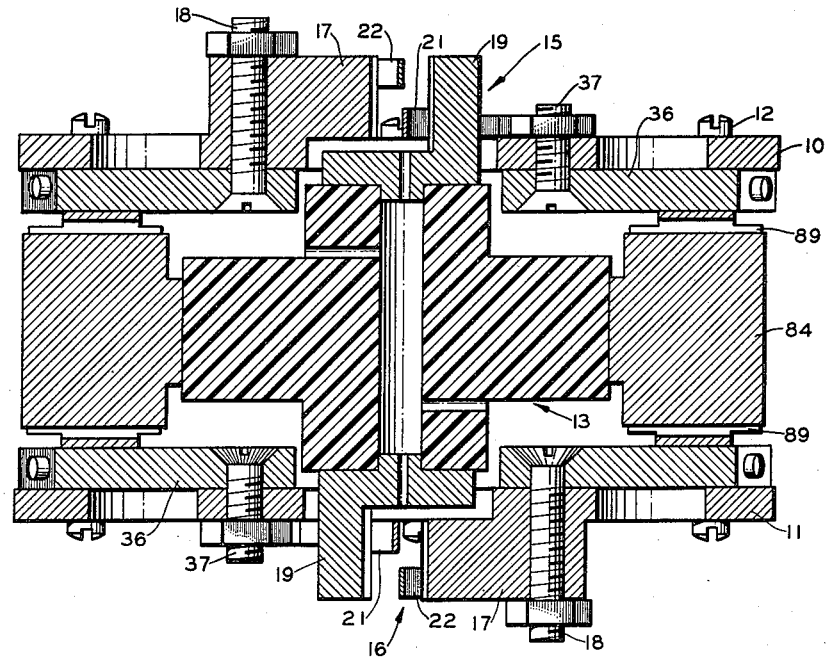
Figure 7 is a vertical sectional view of a modified seismometer construction.
Figure 8:
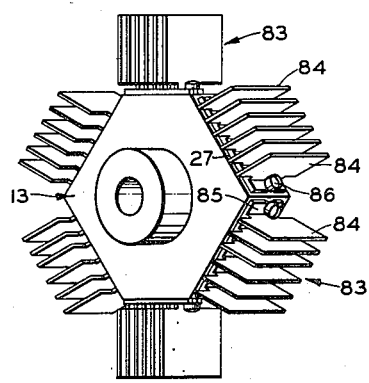
Figure 8 is a perspective view of the suspended element assembly of Figure 7.
Figure 9:
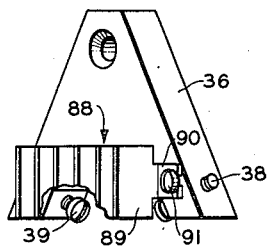
Figure 9 is a perspective view of one of the condenser elements secured to the casing.

A modified form of seismometer is shown by Figures 7, 8 and 9. This modification differs from that of Figure 1 principally in the construction of the condenser elements. The construction of the supports, spring suspensions and suspended element is similar to that of Figures 1 to 4, and like parts are indicated by similar reference characters.

In Figures 7 to 9, the suspended element 13 carries a series of condenser units 83, each unit having a series of thin, flat metal plates 84 which are formed integrally with a rib 85, this rib being secured to the adjacent flat surface 27 of the suspended element by screws 86. Preferably and advantageously, the plates 84 and rib 85 of each unit are formed by machining these parts from a block of metal, and this enables the plates to be disposed in an accurate parallel spaced arrangement. It will be understood that a high degree of precision is necessary in the spacing of the plates 84 since the earth movements to be detected are extremely minute and, accordingly, the movements of the plates relative to each other are extremely small. The plates are of rectangular configuration rather than semicircular, as in Figures 1 to 4, thus enabling an increased surface area to be obtained with resultant increase in the total capacity of the condenser units.

The condenser elements 36 carried by the respective flat supports 10 and 11 carry condenser units 88 of generally similar construction. Thus, each such unit comprises a series of thin flat plates 89 formed integrally with a connecting rib 90, this rib being secured to the adjacent pivoted element 36 by screws 91. The plates 89 are also of rectangular shape but differ from the plates 84 in that the width of each plate 89 is equal to the length of plates 84 whereas the length of each plate 89 is equal to the width of plates 84. Accordingly, when these plates are mounted in interfitting relationship, as described in connection with Figures 1 to 4, each plate 84 is closely spaced to a plate 89 carried by upper support 10 and a plate 89 carried by lower support 11 throughout the entire surface area of the plate. The operation of the modification of Figures 7 to 9 is similar in all respects to the seismometer of Figures 1 to 4. However, improved results are obtained due to the greater precision in the spacing of the plates 84, 89 and due to the increased surface area thereof.

Figure 10:
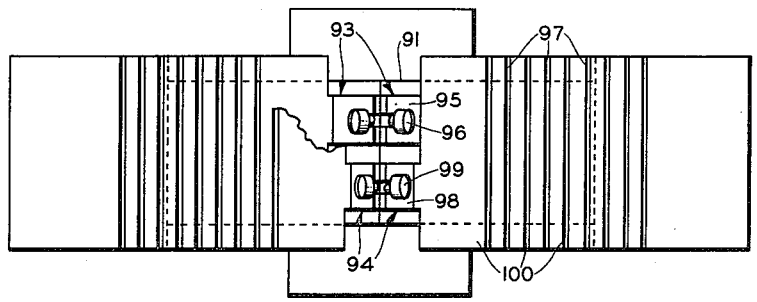
Figure 10 is a front elevational view of a modified construction of the suspended element.
Figure 11:
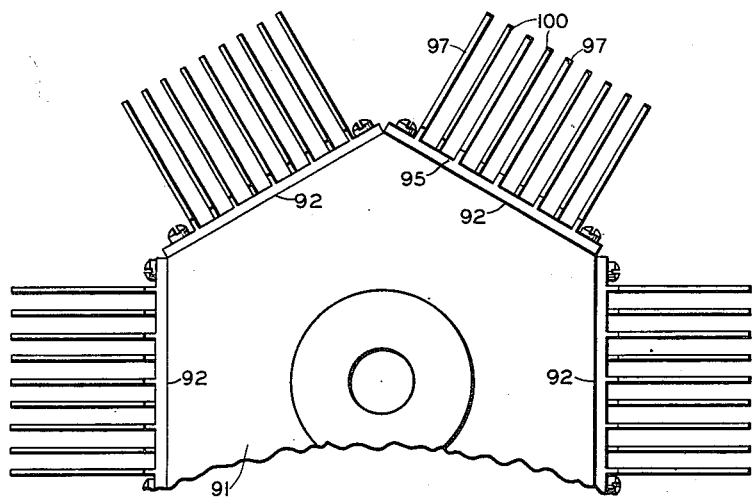
Figure 11 is a top view of the suspended element of Figure 10.
Figure 12:
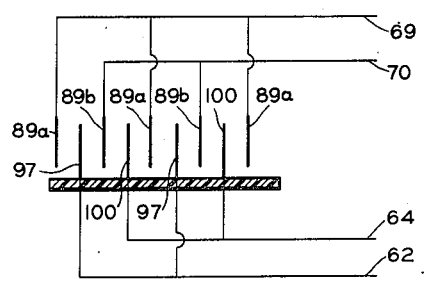
Figure 12 is a schematic view illustrating the cooperation of the suspended element of Figures 10 and 11 with the casing and stator elements of Figures 1 or 7.

In a further modification of the invention, the space between the two sets of condenser elements is more efficiently utilized by providing two independent sets of condenser plates carried by the suspended element. This is shown by Figures 10, 11 and 12 wherein a suspended element 91 of generally the same construction as described in connection with previous figures has a series of outer surfaces 92, each of which carries two sets 93, 94 of condenser plates. Each set 93 includes a rib 95 secured to the suspended element 91 as by screws 96, the rib 95 having a series of plates 97 formed integrally therewith. Each of the sets 94 has an integral rib 98 secured to suspended element 91 as by screws 99, each rib 98 having a series of plates 100 formed integrally therewith. It will be noted that the respective sets 97 and 100 of condenser plates fit between each other and protrude outwardly from the respective ribs 95, 98 so that the plates 100 do not contact rib 95 and the plates 97 do not contact rib 98.

These plates 97, 100 cooperate with the plates 89, Figure 7, carried by the upper and lower supports 10 and 11 in the manner illustrated by Figure 12 wherein it will be noted that plates 89a carried by upper support 10 alternate with plates 89b carried by lower support 11, these plates, in turn, alternating with the plates 97, 100 of the respective sets 93, 94 of condenser plates. This arrangement of plates may be advantageously used with the circuit of Figure 6. The plates 97 of the several units are connected by conductor 62 to the grid of triode 63 while the plates 100 are connected by conductor 64 to the control grid of triode 65. The plates 89a are all interconnected by conductor 69 which leads to the upper half of the secondary winding of transformer 67 while the plates 89b are all connected by conductor 70 which extends to the lower part of the secondary winding of transformer 67. The circuit operates in the same manner as previously described in connection with the seismometer of Figures 7, 8 and 9. The advantage of this modification is that both sides of each plate 89a, 89b are utilized by providing an extra series of sets of condenser plates upon the suspended element whereas, in the seismometer of Figures 1 or 7, only one side of each stator plate is utilized. In particular, referring to Figure 1, only one side of each plate 45, 49 is used, whereas, in Figure 12, both sides of each plate 89a, 89b are operable in varying the capacitance of the seismometer.

It will be apparent that the described seismometer affords a number of important advantages. The construction is very rugged and suitable for use in the field without impairing the high sensitivity of the seismometer to the rotational component of earth movements, the large plate area of the condenser units and the lightness of the suspended element structure 13 contributing to a considerable degree to this sensitivity. In addition, the seismometer may be readily adapted for measuring various time derivatives of the rotational component of seismic waves by adjustment of the stiffness of the springs in the suspension units 15, 16 and by adjustment of the grid impedance of the tubes which are responsive to the capacitance variations produced by the seismometer. The seismometer readily measures very small rotational components, the amplitude of which is oftentimes considerably smaller than the translational earth movements measured by conventional types of seismometers.

While the invention has been described in connection with a present, preferred embodiment thereof, it is to be understood that this description is illustrative only and is not intended to limit the invention, the scope of which is defined by the appended claims.

Having described my invention, I claim:

1. A capacitive seismometer for measuring the rotational component of seismic waves comprising, in combination, a casing, a suspended element mounted for rotation with respect to said casing, means biasing said suspended element to a predetermined angular position and preventing axial or transverse displacement thereof with respect to said casing, a condenser element mounted on said casing, and a condenser element mounted on said suspended element whereby relative angular movement between the suspended element and casing produces a change in the capacitance between said condenser elements which is representative of said angular movement.

2. A capacitive seismometer for measuring the rotational component of seismic waves comprising, in combination, a casing, a suspended element mounted for rotation with respect to said casing, means biasing said suspended element to a predetermined angular position and preventing axial or transverse displacement thereof with respect to said casing, a condenser element mounted on said casing, and a condenser element mounted on said suspended element, each of said elements including a series of thin flat metal plates disposed in parallel closely spaced arrangement, the plates of one element fitting between the plates of the other element, whereby relative rotational movement between said casing and said suspended element produces a change in the capacitance between said plates which is representative of said angular movement.

3. A capacitive seismometer for measuring the rotational component of seismic waves comprising, in combination, a casing, a suspended element mounted for rotation with respect to said casing, means biasing said suspended element to a predetermined angular position and preventing axial or transverse displacement thereof with respect to said casing, a series of condenser elements spaced radially around said suspended element, a series of condenser elements mounted on said casing, each casing element cooperating with one of the radially spaced condenser elements, and each element including a series of thin flat metal plates disposed in parallel closely spaced arrangement, whereby relative movement between said radially spaced condenser elements and said casing produces a change in the capacitance between each cooperating set of condenser elements which is representative of said angular movement.

4. A capacitive seismometer for measuring the rotational component of seismic waves which comprises, in combination, a casing including two spaced supporting plates, a suspended element rotatably mounted in said casing between said supports, a spring suspension for biasing said suspended element to a predetermined angular position relative to the casing and for preventing axial or transverse displacement of the suspended element relative to the casing, a set of condenser elements mounted on each support, each element including a series of flat thin metal plates disposed in parallel closely spaced arrangement, the plates of said elements being mounted in interfitting relation, a condenser unit carried by said suspended element and including a series of thin metal plates disposed in parallel closely spaced arrangement, the plates of said unit fitting between the plates of said condenser elements so that each plate of said unit is disposed between two other plates, one of which is associated with each of said condenser elements.

5. A capacitive seismometer for measuring the rotational component of seismic waves which comprises, in combination, a casing including two spaced supporting plates, a suspended element rotatably mounted in said casing between said supports, a spring suspension for biasing said suspended element to a predetermined angular position relative to the casing and for preventing axial or transverse displacement of the suspended element relative to the casing, a series of condenser elements mounted on one of said supports, a series of condenser elements mounted on the other support, each element including a series of flat thin metal plates disposed in parallel closely spaced arrangement, the plates of each element on one support fitting between the plates of an element upon the other support, a series of condenser units arranged circumferentially about said suspended element, each unit including a set of thin flat metal plates disposed in closely spaced parallel arrangement, the plates of each unit fitting between the plates of two associated condenser elements so that each plate of said units is mounted between two plates mounted on the respective supports carried by said casing.

6. A capacitive seismometer for measuring the rotational component of seismic waves which comprises, in combination, a casing including two spaced supports, a suspended element rotatably mounted in said casing between said supports, a spring suspension for biasing said suspended element to a predetermined angular position relative to the casing and for preventing axial or transverse displacement of the suspended element relative to the casing, a series of condenser elements arranged in circular formation upon one of said supports, each element including a member pivoted to said support, means for adjusting the angular position of said member about its pivot, a series of flat thin metal plates carried by said member, said plates being disposed in parallel closely spaced arrangement, a series of condenser elements of the character described arranged in circular formation on the other support, the plates of each such element fitting between the plates of one of the first condenser elements to form an assembly, a series of condenser units disposed circumferentially about said suspended element, one unit cooperating with each assembly, each unit including a series of flat thin metal plates arranged in closely spaced parallel formation, said plates fitting between the plates of the associated assembly so that each suspended element plate is disposed between two plates forming a part of two condenser elements.

7. A seismometer constructed in accordance with claim 6 in which each set of plates has a connecting rib formed integrally therewith for holding same in closely spaced parallel arrangement, said rib including means for attaching the plate assembly to said suspended element or one of said pivot members.

8. A seismometer constructed in accordance with claim 6 in which each set of plates has a connecting rib formed integrally therewith for holding same in closely spaced parallel arrangement, said plates being of generally rectangular configuration, said rib having openings at the opposite ends thereof to receive screws for attaching the plate assembly to said suspended element or one of said pivot members.

9. A capacitive seismometer for measuring the rotational component of seismic waves which comprises, in combination, a casing including two spaced supports, a suspended element rotatably mounted in said casing between said supports, a spring suspension for biasing said suspended element to a predetermined angular position relative to the casing and for preventing axial or transverse displacement of the suspended element relative to the casing, a series of condenser elements arranged in circular formation upon one of said supports, each element including a member pivoted to said support, means for adjusting the angular position of said member about its pivot, a rod, a bracket for clamping one end of said rod to said pivoted member, a series of flat thin metal plates carried by said rod, said plates being disposed in parallel closely spaced arrangement, and a bracket secured to one of said plates to hold said rod and said plates in fixed position upon said pivoted member, a series of condenser elements of the character described arranged in circular formation on the other support, the plates of each said element fitting between the plates of one of the first condenser elements to form an assembly, a series of condenser units disposed circumferentially about said suspended element, one unit cooperating with each assembly, each unit including a rod, means for clamping both ends of said rod to said suspended element, and a series of flat thin metal plates arranged in closely spaced parallel formation and secured to said rod, said plates fitting between the plates of the associated assembly so that each suspended element plate is disposed between two plates forming a part of two condenser elements.

10. A seismometer constructed in accordance with claim 9 in which the plates are all of generally hemispherical shape, the straight portion of each suspended element plate abutting said suspended element and a peripheral region of each plate forming a part of said condenser elements abutting one of said pivoted members.

11. A capacitive seismometer for measuring the rotational component of seismic waves which comprises, in combination, a casing including two flat supports, a series of spacers holding said supports in spaced relation, a suspended element rotatably mounted in said casing between said supports, a spring suspension for biasing said suspended element to a predetermined angular position relative to the casing, and for preventing axial or transverse displacement of the suspended element relative to the casing a series of condenser elements arranged in circular formation upon one of said supports, each element including a member pivoted to said support, a pair of set screws carried by each support and adapted for engagement with two adjacent spacers to adjust the angular position of said member about its pivot, a rod, a bracket for clamping one end of said rod to said pivoted member, a series of flat thin metal plates carried by said rod, said plates being disposed in parallel closely spaced arrangement, and a bracket secured to one of said plates to hold said rod and said plates in fixed position upon said pivoted member, a series of condenser elements of the character described arranged in circular formation on the other support, the plates of each said element fitting between the plates of one of the first condenser elements to form an assembly, a series of condenser units disposed circumferentially about said suspended element, one unit cooperating with each assembly, each unit including a rod, means for clamping both ends of said rod to said suspended element, and a series of flat thin metal plates arranged in closely spaced parallel formation and secured to said rod, said plates fitting between the plates of the associated assembly so that each suspended element plate is disposed between two plates forming a part of two condenser elements.

12. Apparatus for seismic prospecting which comprises, in combination, a seismometer including three sets of condenser elements constructed and arranged so that seismic waves incident upon the seismometer increase the capacitance between first and second condenser elements and decrease the capacitance between first and third condenser elements, means for applying voltages of opposite polarity to said second and third condenser elements, an electron tube having an anode, a cathode, and a control grid, means for supplying operating potentials to said tube, and a lead connecting said control grid to said first condenser element.

13. Apparatus for seismic prospecting which comprises, in combination a seismometer including a casing, a suspended element, a spring suspension mounting said suspended element for rotary movement with respect to said casing, a series of thin flat metal plates extending radially from said suspended element, two groups of condenser elements carried by said casing each including a plurality of thin flat metal plates, said plates being constructed and arranged so that each suspended element plate is positioned between two plates carried by the casing, said two plates forming a part of different condenser elements, an electron tube having an anode, a cathode, and a control grid, means for supplying operating potentials to said tube, a lead connecting said suspended element plates to said control grid, and means for applying voltages of opposite polarity to the two plates adjacent each of the suspended element plates.

14. Apparatus for seismic prospecting which comprises, in combination, a seismometer including a casing, a suspended element, a spring suspension mounting said suspended element for rotary movement with respect to said casing, a series of thin flat metal plates extending radially from said suspended element, two groups of condenser elements carried by said casing each including a plurality of thin flat metal plates, said plates being constructed and arranged so that each suspended element plate is positioned between two plates carried by the casing, said two plates forming a part of different condenser elements, a pair of electron tubes having an anode, a cathode, and a control grid, means for supplying operating potentials to the electrodes of said tubes, a lead connecting a portion of the suspended element plates to one of said control grids, a lead connecting another portion of said suspended element plates to the other control grid, means for supplying voltages of opposite polarity to the two plates adjacent each armature plate, the voltages applied to the casing plates cooperating with the first group of suspended element plates being of opposite polarity to the voltages applied to the casing plates cooperating with the other group of suspended element plates.

15. A capacitive seismometer for measuring the rotational component of seismic waves which comprises, in combination, a casing including two spaced supporting plates, a suspended element rotatably mounted in said casing between said supports, a spring suspension for biasing said suspended element to a predetermined angular position relative to the casing and for preventing axial or transverse displacement of the suspended element relative to the casing, a series of condenser elements mounted on one of said supports, a series of condenser elements mounted on the other support, each element including a series of flat thin metal plates disposed in parallel closely spaced arrangement, the plates of each element on one support fitting between the plates of an element upon the other support, a series of condenser units arranged circumferentially about said suspended element, each series having two sets of thin, flat metal plates disposed alternately in closely spaced parallel arrangement, said plates on the suspended element alternating with the plates of the two condenser elements mounted on said supports.

16. A seismometer constructed in accordance with claim 15 in which each set of plates has a connecting rib formed integrally therewith for holding same in closely spaced parallel arrangement, said rib including means for attaching the plate assembly to said suspended element, or one of said pivot members.

17. A seismometer constructed in accordance with claim 15 in which each set of plates has a connecting rib formed integrally therewith for holding same in closely spaced parallel arrangement, said plates being of generally rectangular configuration, said rib having openings at the opposite ends thereof to receive screws for attaching the plate assembly to said suspended element or one of said pivot members.

RAYMOND G. PIETY.

References Cited in the file of this patent

UNITED STATES PATENTS

| Number | Name | Date |
| --- | --- | --- |
| 2,272,984 | Ritzmann | Feb. 10, 1942 |
| 2,316,915 | Truman | Apr. 20, 1943 |
| 2,319,940 | Marrison | May 25, 1943 |
| 2,390,187 | Sharpe | Dec. 4, 1945 |
| 2,408,478 | Petty | Oct. 1, 1946 |
| 2,476,410 | Gardiner | July 19, 1949 |

FOREIGN PATENTS

| Number | Country | Date |
| --- | --- | --- |
| 509,783 | Great Britain | July 20, 1939 |
| 470,454 | Germany | Jan. 15, 1929 |

OTHER REFERENCES

"Study of Some Seismometers," Irland, Tech. Paper 556 of U. S. Bureau of Mines (1934), pp. 10–14.